United States Patent
Kozlov

[15] 3,638,022
[45] Jan. 25, 1972

[54] LOW-ENERGY NUCLEAR RADIATION DETECTOR OF THE SEMICONDUCTOR TYPE

[72] Inventor: Stanislav Fedorovich Kozlov, B. Akademicheskaya ulitsa, 49, korpus, 1, kv. 18, Moscow, U.S.S.R.

[22] Filed: Sept. 22, 1969

[21] Appl. No.: 859,739

[30] Foreign Application Priority Data

Sept. 20, 1968 U.S.S.R...............................1272308
Jan. 31, 1969 U.S.S.R...............................1302862

[52] U.S. Cl. .........................................250/83.3 R, 250/83.1
[51] Int. Cl. ..............................................................G01t 1/24
[58] Field of Search...................................250/83.1, 83.3 R

[56] References Cited

UNITED STATES PATENTS 2,760,078  8/1956  Youmans..............................250/83.3
2,765,385  10/1956  Thomsen..........................250/83.3 X
2,806,145  9/1957  Cotty..................................250/83.3
2,951,942  9/1960  Kramish..............................250/83.1

Primary Examiner—Archie R. Borchelt
Attorney—Waters, Roditi, Schwartz and Nissen

[57] ABSTRACT

A device for detecting low-energy nuclear radiations and nuclear radiations in corrosive (reactive) media with a detector on the basis of a diamond crystal plate with contacts formed at the opposite sides thereof, one of these contacts disposed on the plate side adapted to be irradiated is made blocking in relation to charge carriers, while the opposite contact disposed on the plate side not adapted to be irradiated is made of a material capable, in conjunction with a diamond, of injecting charge carriers under the influence of an applied electric field, the blocking contact being made of metal carbides.

4 Claims, 1 Drawing Figure

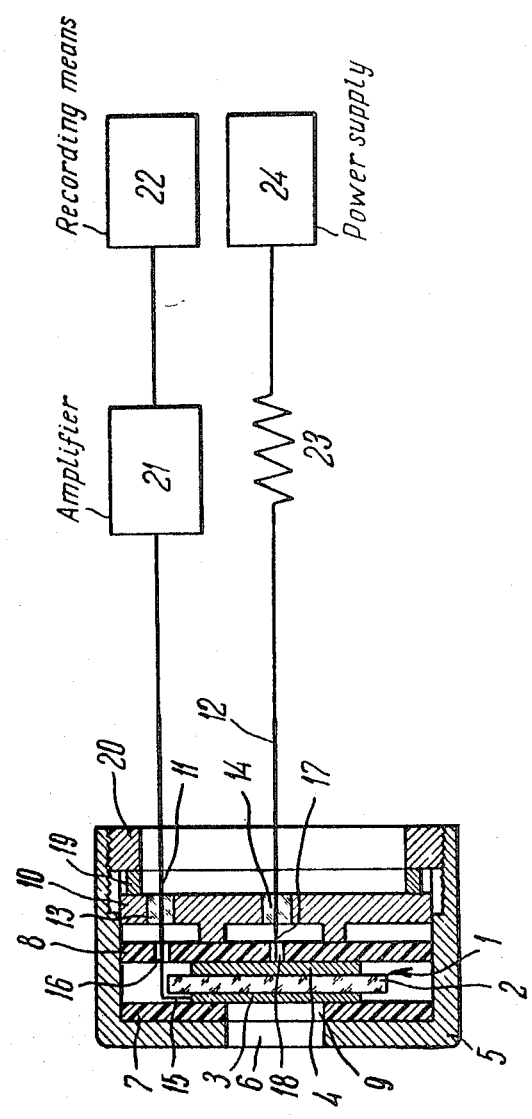

3,638,022

LOW-ENERGY NUCLEAR RADIATION DETECTOR OF THE SEMICONDUCTOR TYPE

The present invention relates to nuclear radiation detectors and devices for detecting low-energy nuclear radiation and nuclear radiation in corrosive (reactive) media.

It is known, that devices, comprising scintillation counters with photomultiplier tubes, flow counters or silicon detectors, are widely used for detecting low-energy nuclear radiations, such as electrons emitted by $H^3$ and $C^{14}$ sources. However, scintillation counters and flow detectors have poor counting and spectrometric properties. Moreover, they are complicated and inconvenient in operation. A limitation of the devices with silicon detectors is low detection efficiency owing to high noise level of the detector at room temperature. For reducing noise these detectors should be cooled.

It is also known, that silicon detectors, along with silicon carbide detectors, are used in devices designed for the detection of nuclear radiations in corrosive (reactive) media, for instance, in acid or alkaline solutions. Because of their insufficient chemical resistance, however, silicon detectors become etched in alkalis and oxidized in acids, if they operate in direct contact with these media, especially at elevated temperatures. Although silicon carbide detectors have high chemical resistance, they possess, however, poor counting efficiency and low signal-to-noise ratio. Another limitation of the devices comprising silicon or silicon carbide detectors is that the properties of these detectors are considerably changed during operation, this fact decreasing their stability and service life.

Devices with diamond detectors have not been used for detecting low-energy nuclear radiations and for operating in radioactive corrosive (reactive) media, since the known diamond detectors had poor counting and spectrometric properties and polarized under prolonged irradiation.

We have proposed a new diamond detector for nuclear radiation (see our application Ser. No. 716,953). It is essentially a diamond crystal plate with two contacts formed at the opposite sides thereof. One of these contacts disposed on the plate side adapted to be irradiated is made blocking in relation to charge carriers, while the opposite contact disposed on the plate side not adapted to be irradiated is made of a material, capable, in conjunction with a diamond, of injecting charge carriers under the influence of an applied electric field. The thickness of the operating range of the diamond plate between said contacts does not exceed the distance travelled by charge carriers in the diamond crystal under the influence of an applied electric field. Such diamond detectors are used for detecting low-energy nuclear radiations and for investigating radioactive corrosive (reactive) media. In some cases, however, the diamond detectors described above cannot satisfy practical requirements.

It is an object of the present invention to provide a nuclear radiation detector that will allow low-energy nuclear radiation to be detected with high efficiency and will operate in radioactive corrosive (reactive) media with high stability.

In the accomplishment of the above and other objects of the invention, in a detector which is essentially a diamond crystal plate with contacts formed at the opposite sides thereof and designed for applying an electric field to said plate, one of which contacts disposed on the plate side adapted to be irradiated is made blocking in relation to charge carriers, while the opposite contact disposed on the plate side not adapted to be irradiated is made of a material capable, in conjunction with a diamond, of injecting charge carriers under the influence of an applied electric field, the thickness of the operating range of said plate between the contacts not exceeding the distance travelled by charge carriers in the diamond crystal under the influence of an applied electric field, according to the invention, the blocking contact is made of metal carbides.

For detecting low-energy nuclear radiation the blocking contact may be made of tantalum carbide. In order to detect nuclear radiation in corrosive (reactive) media the blocking contact may be made of platinum carbide.

With the use of such detectors a device may be provided for detecting low-energy nuclear radiations and nuclear radiations in corrosive (reactive) media. This device comprises said detector, means for amplifying and recording output signals and a detector power supply. According to the invention, the diamond detector is mounted in a sealed housing having a window opening, hermetically enclosed by said blocking contact.

For a better understanding of the invention presented hereinbelow is a description of an exemplary embodiment thereof with reference to the sole FIGURE of the accompanying drawing, in which a schematic view of the device with the diamond detector is shown in accordance with the invention.

In the device for nuclear radiation detection the nuclear radiation detector 1 is essentially a diamond crystal plate 2, on whose opposite sides contacts 3 and 4 are provided. The contact 3 made of metal carbide is blocking in relation to charge carriers. The contact 4 disposed on the opposite side of the plate 2 is made of a material capable, in conjunction with a diamond, of injecting charge carriers under the influence of an applied electric field. If is formed, for instance, by doping the surface layer of the diamond crystal plate 2 with boron. The thickness $d$ of the operating range of plate 2 between the contacts 3 and 4 does not exceed the distance travelled by charge carriers in the diamond crystal under the influence of an applied electric field and is given by the expression $$d \leq \delta = \mu \tau E,$$

where $\mu$ is the mobility of charge carriers (electrons or holes), $\tau$ is the lifetime of charge carriers, $E$ is the applied field strength, $\delta$ is the distance travelled by charge carriers under the influence of the applied electric field.

The blocking contact through which nuclear radiation under investigation penetrates the diamond detector must have such a thickness, as to transmit the nuclear radiation completely for providing minimum losses of its energy. It is particularly essential when detecting low-energy nuclear radiation, since the detector signals are small. In addition, it is of great importance when detecting nuclear radiation having a continuous energy spectrum, because it allows the detection efficiency to be increased. As investigations have shown, the blocking contact permeable to low-energy nuclear radiation is formed by metal carbides, such as tantalum carbide.

For ensuring reliable operation of the device during detecting nuclear radiation in corrosive (reactive) media it is necessary that the blocking contact of the diamond detector withstand attack in intimate contact with the media. As investigations have shown, some metal carbides, for instance platinum carbide, form a blocking contact which is practically resistant to any corrosive (reactive) media. In addition, such a blocking contact has a negligible thickness and is actually permeable to incident nuclear radiation as has been mentioned above. This allows low-energy nuclear radiation to be efficiently detected in corrosive (reactive) media. In the proposed device the detector 1 is mounted in a housing 5 having a window opening 6. There are insulating and sealing gaskets 7 and 8 inside the housing 5, for preventing radioactive medium from entering the housing that would result in shorting the electric circuit of the diamond detector 1. A window opening 9 is provided in the gasket 7, similar and aligned with the window opening 6 in the housing 5. The gasket 7 is tightly adjacent to the edges of the window opening and provides, in conjunction with the blocking contact 3 of the diamond detector 1, a seal of the housing 5 from the side of its window opening 6. The second gasket 8 combined with the first gasket 7 is used for mounting the diamond detector inside the housing. The housing 5 and the gasket 7 are made of a material resistant to radioactive medium. A holder 10 with two metal leads 11 and 12 is disposed in the housing 5. These leads are insulated with the aid of suitable metal-insulator seals 13 and 14. The lead 11 is connected to the blocking contact 3 of the diamond detector 1 by a wire 15, passing through a hole 16 in the gasket 8. The lead 12 is connected to the injecting contact 4 of the diamond detector 1 by a wire 17, passing through a hole 18 in the gasket 8. The connections of the wires 15, 17 to the blocking and the injecting contacts of the diamond detector 1 are accomplished, for instance, by means of silver paint (paste) subjected to appropriate treatment. The gaskets 7 and 8, providing the seal of the detector 1 and the housing 5 from the side of its window opening 6, are pressed tightly through the holder 10 by means of a spring washer (or a spring) 19 and a nut 20. The nut is screwed up into the housing 5 and regulates the pressure force.

The lead 11 designed for transmitting the diamond detector signal arising from bombardment with nuclear radiation is connected to an amplifier 21 with recording means 22. The lead 12 is used for applying a voltage to the diamond detector 1 is connected through a resistor 23 to a power supply 24. In some cases the lead 11 is grounded, while the lead 12 is used both for applying a voltage to the diamond detector and for removing the detector signals induced by incident nuclear radiation. For this purpose, the lead 12 is connected through a blocking capacitor to the amplifier with the recording means.

The present device with the diamond detector operates in the following manner. The housing is inserted in a sealed connector (not shown in the drawing). This connector provides for sealing the housing from the side of the leads and serves for bringing the connecting wires to the diamond detector. Then the housing is immersed in radioactive medium under investigation and a direct voltage is applied to the diamond detector 1 with the aid of the power supply 24. Nuclear radiation penetrates the diamond detector 1 from the side of the blocking contact 4 and causes ionization inside the detector. The resulting charge carriers (electrons and holes) move to the contacts 3 and 4 under the influence of the applied electric field. The electrons travel to the injecting contact 4, if the positive potential is applied to it. The holes travel to the blocking contact 3. On their movement to the contact 4 some electrons are trapped by traps always present in the diamond crystal. As a result, the diamond crystal plate 2 polarizes. The injecting contact 4 is designed to remove said polarization. Since deep traps are present in the diamond, the injection currents from the contact 4 are limited by the space charge accumulated by these traps. Thus, the injection currents do not induce significant conductivity and, consequently, noise. However, when field and charge equilibrium inside the diamond crystal plate is disturbed due to polarization created by incident nuclear radiation, the charge carriers (holes) injected by the contact 4 restore the initial steady state of the crystal.

Some holes travelling to the contact 3 may also be trapped. In this case, however, the trapped holes are in the ionization zone and can be neutralized by the charge carriers of the opposite sign, i.e., by electrons. In addition, when detecting heavily ionizing nuclear radiation, losses in the electron-hole plasma are reduced, since the field strength is higher in the vicinity of the blocking contact 3.

The signal removed from the blocking contact 3 of the diamond detector 1 is fed to the input of the amplifier 21 and then to the recording means 22, such as a scaler. When measuring in some liquid radioactive media, peculiar difficulties arise from adsorption, due to which the obtained results are misrepresented. Appropriate precautions can be taken, however, to minimize effects of adsorption.

With a view to increasing the detecting area, two diamond detectors may be used. They are arranged so that their injecting contacts are in contact with each other and their blocking contacts are in contact with the medium under investigation. For this purpose, a mosaic may also be composed of said diamond detectors.

The present device allows nuclear radiation to be detected at high pressures, if the housing containing the diamond detector is resistant to high pressure and the diamond detector is properly sealed. In some cases for simplicity of the design the diamond detector is encapsulated in suitable compounds resistant to corrosive (reactive) media.

The present device with the diamond detector for nuclear radiation has a number of advantages over the hitherto known devices. Since the blocking contact of the diamond detector may have a negligible thickness and is actually permeable to incident nuclear radiation, this device allows detection of both low-energy and short-range nuclear radiations, emitted by solid, powdery, liquid and gaseous radioactive sources. In addition, it can be used when operating with accelerators. Since the detector is made of a diamond having outstanding chemical resistance and its blocking contact withstands attack of corrosive (reactive) media, the device detects nuclear radiation in corrosive (reactive) media with high stability. It operates practically without noise, since the diamond detector has negligible thermal and current noise at room temperature owing to high resistivity and high forbidden energy gap of the diamond. In addition, the device possesses high sensitivity, good counting efficiency, high energy resolution and high signal-to-noise ratio at room and elevated temperatures. It is simple, reliable and convenient in operation. After measurements the device can be easily cleaned of radioactive comtamination.

I claim:

1. A nuclear radiation detector comprising a diamond crystal plate having opposite sides, one of which is adapted for irradiation, contacts on said opposite sides of the plate for applying an electrical field to said plate, the contact on the side of the plate adapted to be irradiated being a metal carbide and being blocking in relation to charge carriers, while the other contact on the other side of the plate is made of a material capable, in conjunction with diamond, of injecting charge carriers under the influence of the applied electrical field, the thickness of the operating range of said plate between said contacts being less than the distance travelled by charge carriers in the diamond crystal under the influence of the applied electrical field.

2. A detector according to claim 1 for detecting low-energy nuclear radiation, wherein said metal carbide of the blocking contact is tantalum carbide.

3. A detector according to claim 1 for detecting nuclear radiation in corrosive media, wherein said metal carbide of the blocking contact is platinum carbide.

4. A device for detecting low-energy nuclear radiation and nuclear radiation in corrosive media, comprising a sealed housing with an enclosed opening, a nuclear radiation detector in said housing comprising a diamond crystal plate having opposite sides, one of which is adapted for irradiation through said opening in the housing, contacts on the opposite sides of said plate for applying an electrical field to said plate, the contact on the side of the plate adapted to be irradiated being a metal carbide and being blocking in relation to charge carriers while the other contact on the other side of the plate is a material capable, in conjunction with diamond, of injecting charge carriers under the influence of the applied electrical field, the thickness of the operating range of said plate between the contacts being less than the distance travelled by charge carriers in the diamond crystal under the influence of the applied electrical field, said detector being mounted in said housing so that the blocking contact hermetically encloses said opening; a resistor, a detector power supply connected through said resistor to said injecting contact; an amplifier having an input connected to said blocking contact; said means connected to said amplifier for recording output signals.

* * * * *